July 20, 1926.
K. GERSON
1,593,491
TREATMENT OF HOUSEHOLD AND STREET WASTE
Filed Nov. 26, 1924
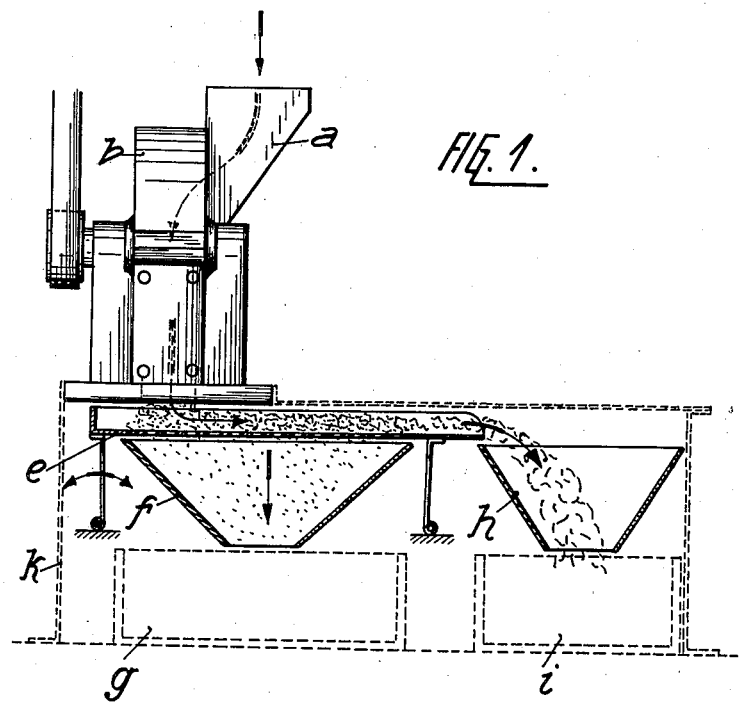
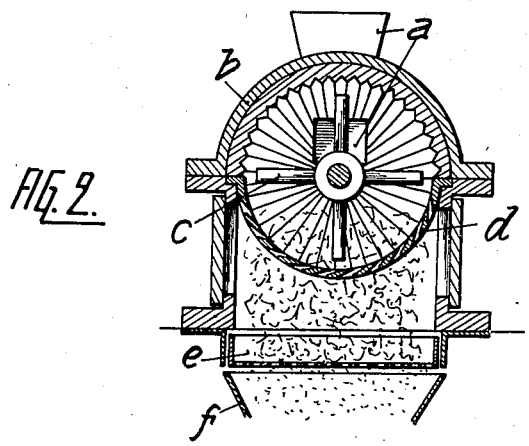
Inventor
K. Gerson
By Marks & Clerk Patented July 20, 1926.

1,593,491

UNITED STATES PATENT OFFICE.

KURT GERSON, OF BERLIN, GERMANY.

TREATMENT OF HOUSEHOLD AND STREET WASTE.

Application filed November 26, 1924, Serial No. 752,467, and in Germany May 6, 1924.

This invention relates broadly to means for disposing of and utilizing solid household and street waste and refuse, such as garbage, street sweepings, in a most efficient and highly economical manner, and it relates in particular to the treatment of material of the kind referred to, substantially composed of rather fibrous, or fragile, and readily disintegrated constituents, such as garbage and similar city and country waste, and of a mixture of such substances and the like, and it is one of the important objects of my invention to effect a separation of the fibrous or fiber-containing constituents from the more powderous or not fibrous constituents and to devise means for turning the same into high-grade marketable products. As compared with the previous art in which a separation of the fibrous and fragile or breakable constituents of the refuse was effected by means of rollers or equivalent means with the result that the texture of the fibrous constituents remained substantially unchanged, my invention among other valuable features is distinguished by the fact that the mixed raw material is submitted to the action of a rapidly operating crushing or beating mill, a disintegrator or any other equivalent high speed grinder or the like by which means the fibrous constituents of the material are converted into a state in which its elements become kinked and are reduced to a feltable condition, while the brittle, fragile and readily split constituents are at the same time reduced to a powder or granules of a size to admit of the easy separation of the powder from the felted material. The said felted material constitutes a woolly product, not yet obtainable heretofore in the treatment of solid household and street refuse, and which for the sake of shortness of expression I shall designate as "garbage wool" and which consists almost exclusively of a combination of fine particles of cellulose fibers, and it is another object of my invention to devise means for the production of such garbage wool.

In the practise of my invention for the treatment of household garbage, street sweepings and the like I preferably proceed by first separating the crude garbage material in any suitable manner from the coarser metallic admixtures, among which iron parts are particularly frequent which may for instance be removed by a magnetic separator, while the ashes and other dust-like constituents are sifted out or strained; and in case the garbage should be particularly wet it is submitted to preliminary drying. The material having undergone these preliminary treatments is fed to a rapidly running disintegrating device, such as for instance an edge runner, a crushing, beating or breaking mill in which the disintegrating member, the runner, is moved at a high number of revolutions, by which means the grinding material is both torn, lacerated and crushed at the same time. Comminuting means working in the manner referred to operate somewhat in the manner of the teazing, willowing and picking devil or equivalent fibre loosening means, while the brittle constituents are spilt and undergo a very thorough comminution.

My invention will be further described with reference to the accompanying drawing, showing by way of example a cross beater mill as an exemplification of a rapidly running disintegrator embodying the general principles of my invention, the device being shown in Figure 1 in side view, and in Figure 2 in vertical cross section.

The rapidly running cross beater mill employed as an example for the carrying out of the invention comprises a feeding hopper $a$ and a runner, consisting of four cross shaped beating arms $c$, and disposed with a casing $b$ provided at the interior with ribs and flutings, and revolved by any suitable means. A portion of the casing, as appears from Figure 2, is formed by a grating $d$. The refuse is charged into the hopper $a$, and is then caught by the beater or the like contained in the casing $b$, where it is acted upon by the arms $c$ and converted into the garbage wool and into a fine powder. The entire resulting material drops through the grating $d$ upon a shaking sieve or any other kind of strainer $e$, and by the vibratory action of the sieve or strainer an additional felting of the fibrous material and the separation of the fine powder is effected which latter substantially consists of mineral constituents and drops through the funnel $f$ into a collecting tank $g$ or the like. The garbage wool is moved along the shaking sieve $e$ and drops through another funnel $h$ into the collector $i$. From these two collecting containers $g$ and $i$ the products may be continually discharged or fed forward by any suitable conveying or propelling means. The entire sifting and straining means the construction and arrangement of which may be of any kind desired, may be preferably secured against dusting in a casing *k*.

My invention is obviously not restricted to the particular disintegrating means herein shown and described, and instead of a cross beater mill of the kind above referred to the treatment of the garbage may also be effected for instance by a rapidly revolving beater cam stroke mill, pin-grinders, tooth-grinders, hammer mill, disintegrator, dismembrator, centrifugal ball mill, pedulum oscillatory mill or equivalent comminuting and grinding means, adapted to produce the desired kinking and felting action. The main object of the invention is the separation of the feltable from the pulverulent material and the conversion of the fibrous ingredients into the felting condition, and it is accordingly immaterial, whether the felting and agglomeration of the torn fibrous constituents of the garbage is effected in the comminuting device or partly therein or only during the subsequent travel of the resulting product on the shaking sieve or in any other separating member. The separation of the garbage wool from the fine powder may also be effected by a kind of flotation process by introducing the substance treated in the rapidly rotating comminuting device in the condition as it is discharged from the same, or, after a portion of the powderous constituents have been sifted off therefrom into any suitable flotation apparatus in which the powder is allowed to deposit, while the garbage wool remains suspended in the liquid contained in the apparatus. By admitting some chlorine gas to the flotation device, the color of the garbage wool may be improved and it is also sterilized, though it should be pointed out in this connection that the garbage wool after its production hardly exhibits any appreciable putrefication odor, even in case the raw material shows distinct signs of putrefication.

The further treatment of the garbage wool obtained according to the invention, and which mainly constitutes a cellulose raw material may be effected in further pursuance of my invention by utilizing the same, without any previous treatment in a beater, in the manufacture of crude paste board or the like by introducing the garbage wool directly into the pulp chest of the paper or paste board machine. The fact that the garbage wool obtained by my process does not need to be submitted to the usual treatment in beaters, in order to convert it into a condition suitable for being worked into paper or paste board, is of considerable importance, and renders this material admirably adapted for this further utilization in the manufacture of paper and paste board.

The garbage wool obtained in the manner described may, moreover, be further treated in the same manner as other cellulose raw material by submitting it, for instance, to dry distillation or to dry smouldering combustion. In the dry distillation treatment the well known distillation products occurring in this treatment of cellulose raw material, are formed, such as tar for instance and other distillation products, and the residue yields a coal which may be employed as a high-grade decolorizing carbon. Furthermore than that, the garbage wool on account of its high caloric value and its very convenient and handy manipulation may be directly employed as a fuel for the operation of steam boilers and the like. The powder obtained in the treatment according to this invention and resulting from the split, broken up fragile, brittle constituents of the mixed raw material possesses such a fine distribution that it remains suspended in a water current. It may therefore be advantageously introduced into the sewage draining system containing a sufficiency of sewage or waste water for the carrying along of the powder, and in which it may be mixed with the excreta. The treatment of household garbage, offal and similar refuse described therefore presents the economically important possibility that the entire garbage, offal or the like of a city or a district may be transferred to a pumping station of the sewerage system, where it may be worked into garbage wool and into the fine powder referred to and consisting mainly of mineral ingredients, such treatment on account of the simplicity of the apparatus required being easily carried out at such pumping stations. The said powder may then be admitted into the general sewer system and may be further disposed of together with the excreta and may be converted into a high grade mixed fertilizer which may be directly conveyed by pressure upon land. The garbage wool obtained in the treatment constitutes a comparatively valuable article of commerce for a variety of purposes, or it may be submitted to a further treatment at its place of production, or it may be directly utilized as a fuel for the heating of the steam boilers of the pumping station. In view of the usually central situation of the pumping station in the large cities the costs and the means necessary for carrying the garbage, offal, rubbish or street sweepings and the like by the treatment according to this invention are reduced to a fraction of the costs and distances to be overcome in the means heretofore employed for removing these waste materials from the cities.

While the invention has been described in some of its preferred forms of embodiment I wish it to be understood that I am not restricted thereto, the invention being susceptible of modifications in its practical application and utilization, and without deviating from the broad aspects of the invention, as particularly pointed out in the claims hereunto appended.

I claim:—

1. Method of treating mixed materials such as garbage and street sweepings composed of fibrous, brittle and readily split constituents, consisting in subjecting the mixed material to a crushing and beating action, and converting the fibrous constituent material into a feltable wool-like condition and the brittle, fragile and crushable constituents into powdered form.

2. Method of treating mixed materials as claimed in claim 1, including the step of subjecting the mixed material subsequent to the crushing and beating action to a shaking and straining action to separate the powdered material from the feltable material, and also additionally felting the fibrous material.

3. Method of treating mixed materials such as garbage, street sweepings and the like composed of fibrous, brittle and readily split constituents, consisting in first separating metallic portions and ashes from the metal, then subject this material to a compressing and beating action to convert the fibrous constituent material into a feltable material and the brittle, fragile and crushable constituents into powdered form, and finally subjecting the material to a shaking and straining action so as to separate the powdered form and increase the feltable condition of the feltable material.

In testimony whereof I affix my signature.

DIPL. ING. KURT GERSON.